United States Patent
Hwang et al.

(10) Patent No.: US 11,611,798 B2
(45) Date of Patent: Mar. 21, 2023

(54) IDR FRACKING FOR GLASS TO GLASS LATENCY REDUCTION

(71) Applicant: Sony Interactive Entertainment LLC, San Mateo, CA (US)

(72) Inventors: Alex Hwang, Orinda, CA (US); Bhumik Sanghavi, Santa Clara, CA (US); Joel Freeman, San Rafael, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 14 days.

(21) Appl. No.: 16/376,233

(22) Filed: Apr. 5, 2019

(65) Prior Publication Data

US 2020/0322673 A1  Oct. 8, 2020

(51) Int. Cl.
| | |
|---|---|
| *H04N 21/438* | (2011.01) |
| *H04N 21/4545* | (2011.01) |
| *H04N 21/482* | (2011.01) |
| *H04N 21/845* | (2011.01) |
| *H04N 21/2187* | (2011.01) |
| *H04N 21/2225* | (2011.01) |
| *H04N 21/262* | (2011.01) |
| *H04N 21/234* | (2011.01) |

(52) U.S. Cl.
CPC ... *H04N 21/4384* (2013.01); *H04N 21/45457* (2013.01); *H04N 21/4825* (2013.01); *H04N 21/8455* (2013.01)

(58) Field of Classification Search
None
See application file for complete search history.

(56) References Cited

U.S. PATENT DOCUMENTS

| | | | |
|---|---|---|---|
| 9,438,936 B1* | 9/2016 | Srinivasan | H04N 21/812 |
| 10,749,761 B1* | 8/2020 | Truax | H04L 41/509 |
| 10,771,824 B1* | 9/2020 | Haritaoglu | H04N 21/6373 |
| 2011/0096828 A1* | 4/2011 | Chen | H04N 21/23106 375/240.02 |
| 2012/0198089 A1* | 8/2012 | Dhruv | H04N 21/26258 709/231 |
| 2013/0339500 A1* | 12/2013 | Antonov | H04L 65/602 709/223 |
| 2014/0025830 A1* | 1/2014 | Grinshpun | H04L 5/0064 709/227 |

(Continued)

OTHER PUBLICATIONS

RFC8216 HTTP Live Streaming Aug. 2017.
International Search Report and Written Opinion dated May 12, 2020 for International Patent Application No. PCT/US2020/023968.

*Primary Examiner* — Hung Q Dang
(74) *Attorney, Agent, or Firm* — JDI Patent; Joshua D. Isenberg; Robert Pullman (57) ABSTRACT

To reduce latency in streaming media a playlist requested from a content delivery network may be modified to have modified segmentation. After receiving the playlist from the content delivery network, the location of one or more I-frames in each segment in the playlist may be determined and these locations may be used to generate the modified playlist. The modified playlist may then be sent to a client device. Media segments may be modified in accordance with the modified segmentation of the modified playlist to generate modified media segments that can be sent to the client device.

18 Claims, 5 Drawing Sheets

(56) References Cited

U.S. PATENT DOCUMENTS

| | | | |
|---|---|---|---|
| 2014/0059244 A1* | 2/2014 | Panje | H04N 21/234363 |
| | | | 709/231 |
| 2014/0143440 A1* | 5/2014 | Ramamurthy | H04N 21/23439 |
| | | | 709/231 |
| 2014/0304373 A1* | 10/2014 | Tarbox | H04L 65/60 |
| | | | 709/219 |
| 2016/0119657 A1* | 4/2016 | Sun | H04N 21/6118 |
| | | | 725/94 |
| 2017/0171578 A1* | 6/2017 | Joong | H04N 21/812 |
| 2017/0188072 A1* | 6/2017 | Major | H04N 21/6582 |
| 2018/0041561 A1* | 2/2018 | Davies | H04L 65/4076 |
| 2019/0007756 A1* | 1/2019 | Navali | H04L 63/0428 |
| 2019/0069039 A1* | 2/2019 | Phillips | H04N 21/64769 |
| 2019/0075148 A1* | 3/2019 | Nielsen | H04N 21/47217 |
| 2020/0037045 A1* | 1/2020 | Mahvash | H04N 21/8456 |

* cited by examiner

IDR FRACKING FOR GLASS TO GLASS LATENCY REDUCTION

FIELD OF THE INVENTION

Aspects of the present disclosure generally relate to live streaming media applications and more particularly to improving latency in live streaming applications.

BACKGROUND OF THE INVENTION

Over the top video streaming is becoming ever more popular in comparison to television. While popular, over the top (OTT) video streaming does have several downsides in comparison to broadcast and cable television. Specifically adaptive bitrate streaming requires a connection handshaking, playlist collection and a server managed segmentation scheme.

Additionally, streaming video applications must download and buffer sufficient video data and its related manifests before the video can be played. Due to the nature of internet streaming smaller segment sizes for video are better for reducing the time lag from when the packet is sent and when the packet arrives at its destination, this time lag is also known as network latency.

In addition, it would be desirable to implement a single solution to reduce video start-time and network latency across multiple devices, such as PS4, Roku, Apple-TV, Android Mobile, and the like. A problem with current live video content packagers is that they often use legacy parameters or cater to the lowest common denominator client device. For example, many client devices use 10 second segments just because it was mentioned in the early version of the device specification. Some client devices will accommodate 5 second segments but anything less causes some devices to fail. Segments as short as 1 second are known to work for certain devices and other devices can work with sub-second segment. Due to the wide variety of device capabilities, inefficient content packaging is a reality that streaming pipelines often face. Thus, large packet sizes with high latency are the norm in HLS streaming applications. The major drawback is that streaming media that advertises itself as "live streaming" is actually around 15 seconds or more behind the actual event, e.g., in HTTP live streaming (HLS) applications.

It is within this context that aspects of the present disclosure arise.

BRIEF DESCRIPTION OF THE DRAWINGS

Objects and advantages of aspects of the present disclosure will become apparent upon reading the following detailed description and upon reference to the accompanying drawings in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

While numerous specific details are set forth in order to provide a thorough understanding of embodiments of the disclosure, it will be understood by those skilled in the art that other embodiments may be practiced without these specific details. In other instances, well-known methods, procedures, components and circuits have not been described in detail so as not to obscure the present disclosure. Some portions of the description herein are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm, as used herein, is a self-consistent sequence of actions or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated or otherwise as apparent from the following discussion, it is to be appreciated that throughout the description, discussions utilizing terms such as "processing", "computing", "converting", "reconciling", "determining" or "identifying," refer to the actions and processes of a computer platform which is an electronic computing device that includes a processor which manipulates and transforms data represented as physical (e.g., electronic) quantities within the processor's registers and accessible platform memories into other data similarly represented as physical quantities within the computer platform memories, processor registers, or display screen.

A computer program may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, flash memories, or any other type of non-transitory media suitable for storing electronic instructions.

Aspects of the present disclosure are designed to overcome deficiencies in content packaging while maintaining flexibility of accommodating less capable client devices.

Figure 1:
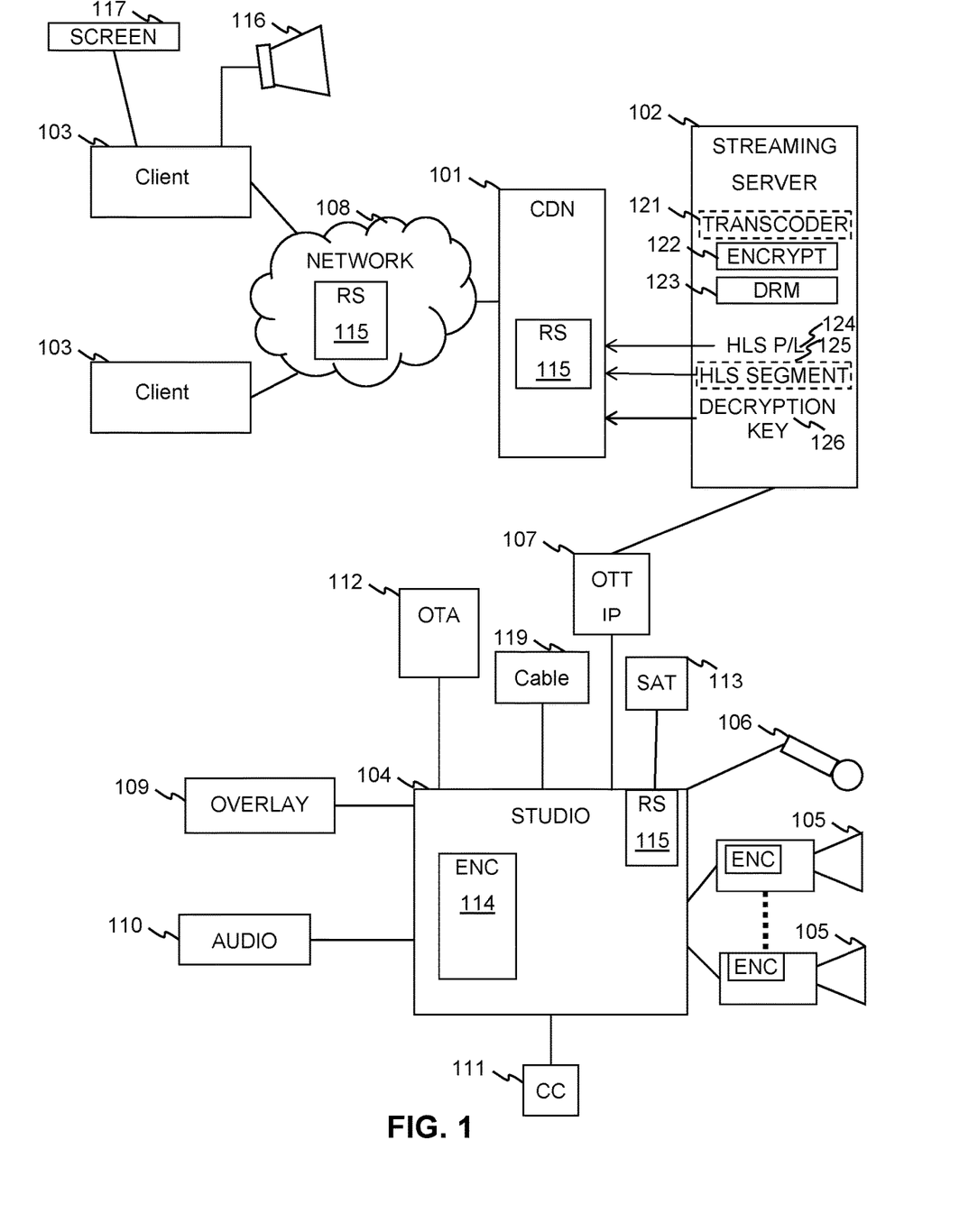
FIG. 1 is a schematic diagram of a network layout of a system for improving latency in streaming applications according to aspects of the present disclosure.

Near real-time live broadcast TV of sporting events, and other important media events has become commonplace but television lacks the convenience and many of the interactive elements of streaming video. Live streaming video often suffers from latency issues that make it near impossible to have near real-time live streaming media. Currently most HLS streams that report to be "live" are 15 or more seconds behind the actual event taking place. This delay is referred to as the "glass to glass time." That is the time it takes for the event to be transmitted through the glass of the camera across a network and to the user through glass of the user's screen. FIG. 1 shows the layout of a system for improving latency in live streaming applications according to aspects of the present disclosure. In a live streaming media application, images may have to go through several different devices before arriving on the user's screen. As shown, video of a live streamed event may be transduced by one or more cameras 105 and sounds may be transduced by one or more microphones 106. The cameras may have built in encoders (ENC) which encode the steaming video in a first format before being sent to a studio 104. As used herein, the term "studio" generally refers to a production facility for producing content, such as audio or video. A studio may produce content and store it in digital form on a network-accessible computer or digital storage device. The studio 104 may edit or otherwise manipulate the video streams before the stream is sent to an Over-The-Top Internet Protocol (OTT IP) server 107. Once the post capturing production (overlays, closed captioning, censoring, etc.) is done, the edited content is ready for delivery packaging, which may include transcoding, encryption, HLS packaging and the like, which may be done by the OTT IP server 107. Once the deliver packaging is done, the result material are delivered to a delivery environment, e.g. CDN for OTT, RF modulated for OTA delivery or sent to cable and satellite service provider for their own processing, Additionally the Studio 104 may send Over-The-Air (OTA) 112 broadcast television systems, to Satellite (SAT) 113 broadcast systems, and Cable 119 Network systems. The video stream may also be sent servers to modify the streams such as Audio editing servers 110, overlay servers 109, and closed captioning servers 111. The Studio may also include an encoder 114 to format the video stream in an encoding format compatible with transmission and a reductive edger 115 that modifies the video stream as is discussed below.

A video stream may be sent through the OTT 107 to the streaming server 102. The streaming server performs numerous operations on the video stream to prepare the stream for transmission to the client. Operations performed by the streaming server may include by way of example and not by way of limitation, video transcoder 121 operations, Encryption 122 operations, Digital rights management (DRM) 123 operations, streaming playlist generation 124, Streaming segment generation 125, decryption key generation and dispatch 126.

According to aspects of the present disclosure after transcoding, encryption and DRM operations the stream playlist, media segments and decryption keys may be sent to a CDN 101. The CDN 101 may be running a Reductive Edger (RE) 115 service or are connected to a standalone Reductive Edger device. The Reductive Edger 115 may modify the received video streams as will be discussed below. The Reductive Edger device or Reductive Edger service then sends the modified video streams to the client device 103 through the network 108.

In another embodiment of the Reductive Edger 115 is a located a remote device located in a cloud server system connected to the network 108. In these embodiments, the CDN 101 sends the video stream, playlists and keys to the Reductive Edger 115. The Reductive Edger modifies the playlists and video streams before they are sent to the client 103 through the network 108.

The client may decrypt encrypted video segments and play the video segments through a screen 117 and one or more speakers 116.

Figure 2:
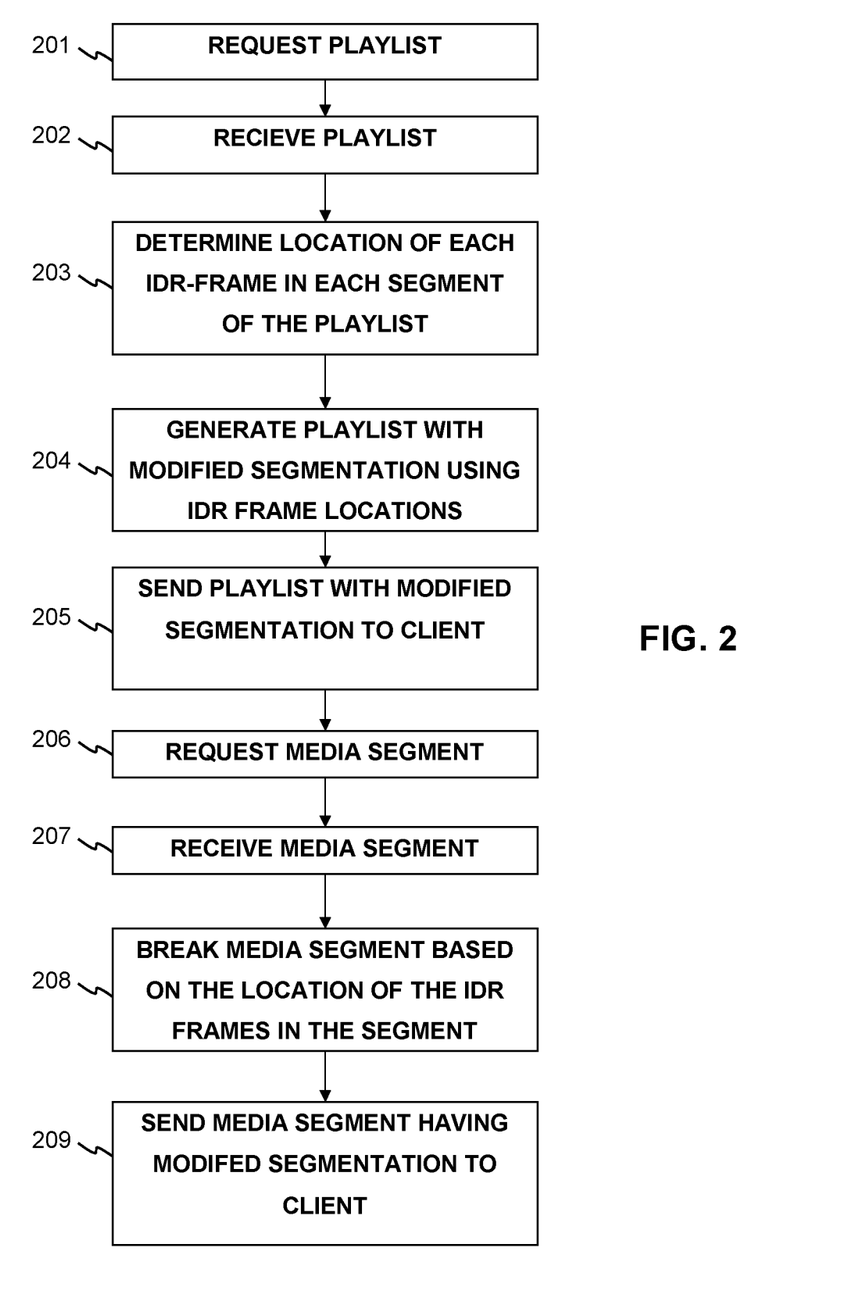
FIG. 2 is a block diagram of a method for improving latency in streaming applications according to aspects of the present disclosure.

According to embodiments of the present invention, a Reductive Edging device may be used to repackage media segments from content delivery networks to reduce network latency between the media source and a client device. FIG. 2 shows a method for latency reduction in streaming applications according to aspects of the present disclosure. The reductive edging device in the content requests playlist from a content delivery network (CDN) or other media server at 201, e.g., as part of the reductive edging techniques described in co-pending U.S. Non-provisional application Ser. No. 16/191,341 content of which are incorporated herein by reference. In response media server sends the playlist to the reductive edger where it is received as indicated at 202. According to some aspects of the present disclosure, the reductive edger may request an I-Frame only playlist from the CDN. The reductive edger may then decrypt or decode the playlist, if necessary, after receipt. The I-frame only playlist may contain frames in IDR format, though other I-frame formats could also be used. Although playlists are not typically encrypted, aspects of the present disclosure include implementations where they could be. For example, a playlist could be transmitted for Hypertext Transmission Protocol Secure (HTTPS), which is encrypted at a different protocol level.

The Reductive Edger may determine the location of I-Frames (e.g., IDR frames) by searching for every IDR-Frame in the decrypted or decoded playlist, as indicated at 203. In some implementations, the playlist is an IDR-Frame only playlist; in this case the Reductive Edger determines the byte range for each frame in each segment in the IDR-Frame only playlist.

An I-frame-only playlist is a convenient source for determining DR frame location, which can be captured at encryption time. If there is no I-frame-only playlist, then the only convenient IDR frame is the first frame of a segment. To uncover other IDR frames in the segment without an I-frame-only playlist, the segment could be decrypted and demuxed to find the other IDR frames within it. In such implementations, the playlist may be De-multiplexed and the byte for the IDR frames in each segment in the playlist is determined. A modified playlist is generated from the byte ranges determined from the playlist at 204. Each segment is split based on the byte ranges for the IDR frames to create two new, smaller segments. In some embodiments, the modified playlist has modified segments wherein segments are split at each IDR frame. A person of ordinary skill in the art would know that as part of the standard for HLS, each media segment must begin with an IDR frame but currently, media segments have more than one IDR frame in each segment. In other embodiments according to aspects of the present disclosure, media segments are split at every other IDR frame or after N number of IDR frames, where N is determined by the network latency. The interval between IDR frames is the smallest segment that can be derived. If the size of this interval is manageable, then the Reductive Edger can split a segment at every IDR frame. This is advantageous since there is less latency with smaller segments. If for some reason the split segment is too small for a client device to handle, then the Reductive Edger can split the segment at every Nth IDR-frame, where N>1, to achieve a segment size the client can handle. According to aspects of the present disclosure, the Reductive Eder may dynamically select the value of N for segments destined for a given target client device. By way of example, and not by way of limitation, consider a case where the IDR frames are one quarter second (0.25 s) apart. If the target client device and network environment can handle segments of this size, N may be set equal to 1. If instead, the target client device can only handle segments that are 1 second or larger then N should be set to at least 4.

The modified playlist is then sent to the client device as indicated at 205. The modified playlist may be sent in response to a request for the playlist from the client device. The client device may send a request to the Reductive Edger to stream the media playlist. For example, the client device may request a specific media segment in the modified playlist. The Reductive Edger may then send a request for the specific media segment to the CDN or other media delivery service, as indicated at 206. Alternatively, the Reductive edger may prospectively request all media segments in the requested playlists. Examples of other media delivery services include streaming media servers or studios. The Reductive Edger receives the requested segment from the CDN or other media delivery service, as indicated at 207. According to aspects of the present disclosure, more often than not, the RE already has the requested segment. The Reductive Edger, among other things, can be regarded as a pre-fetching caching device or process.

The Reductive Edger decrypts the media segment and splits the media segment according to the segmentation of the modified playlist at 208 to generate a media segments having modified segmentation. In some embodiments, the media segments are split at each IDR-frame. In other embodiments, the media segments are split at every other IDR frame or at every N IDR frames where N is determined by the network latency. If the size of this interval is manageable, the Reductive Edger can split a segment at every IDR frame to reduce the segment size. If the resulting split segment size would be too small for a client device to handle, the Reductive Edger can split the segment at every Nth IDR-frame, where N>1, to achieve a segment size the client can handle, as discussed above. After the media segments are split the modified media segments are sent to the client device 209, which decodes them into playable media content and presents the content to the user.

Reductive Edger Device for Enhanced Livestreaming Latency

Figure 3:
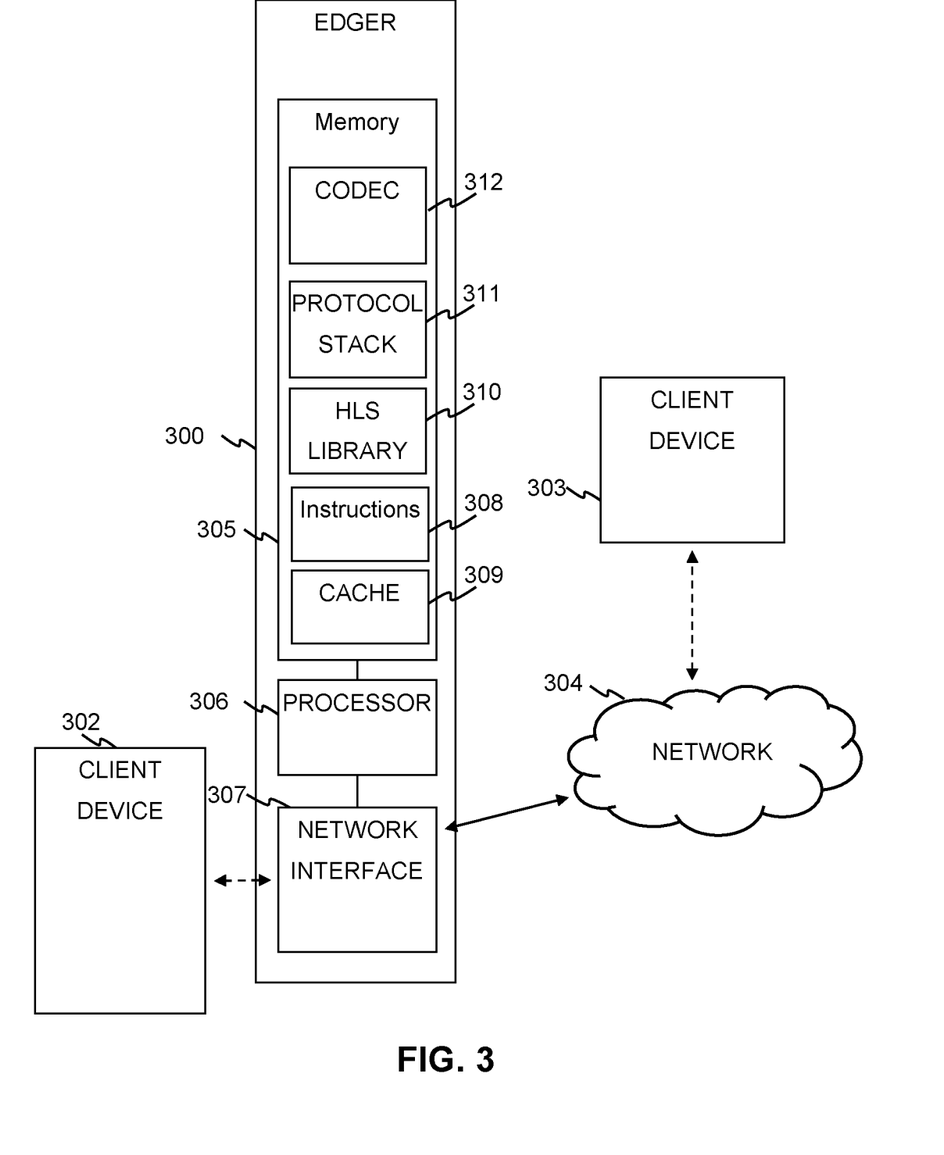
FIG. 3 is a block diagram of a stand-alone reductive edger implementing the method for improving latency in streaming applications according to aspects of the present disclosure.

FIG. 3 shows a standalone Reductive Edging device according to aspects of the present disclosure. The standalone Reductive Edging device or Edger 300 may be coupled to a local client device 302 through a network interface 307 over a LAN or WAN. In other alternative implementation the standalone Reductive Edging device may be in communication through the network interface 307 with a non-local device 303 e.g., servers or another client, through a large network 304 such as the internet. In some implementations the client device is connected to the stand alone Reductive Edging device through a communication bus (not shown) such as, without limitation, a peripheral interconnect (PCI) bus, PCI express bus, Universal Serial Bus (USB), Ethernet port, Fire-wire connector or similar interface.

The standalone Reductive Edging device 300 may include one or more processor units 306, which may be configured according to well-known architectures, such as, e.g., single-core, dual-core, quad-core, multi-core, processor-coprocessor, cell processor, and the like. The standalone Reductive Edging device 300 may also include one or more memory units 305 (e.g., random access memory (RAM), dynamic random access memory (DRAM), read-only memory (ROM), and the like).

The processor unit 306 may execute one or more instructions 308, portions of which may be stored in the memory 305 and the processor 306 may be operatively coupled to the memory through a bus or bus type connection. The instructions 308 may be configured to implement the method for Latency Reduction HLS live streaming systems shown in FIG. 2 as well as instructions for segmenting playlists and media segments. Additionally the Memory 305 may contain instructions for storing Playlists and modified Playlists in a HLS Library and a Protocol Stack defining HLS server locations. The Memory 305 may also contain the HLS Library 310 the Protocol Stack 311 and a coder/decoder (codec) 312. The instructions 308 may further implement storage of media segments and modified media segments in a cache 309 during operation. The Cache 309 may also be located in memory 305.

The standalone Reductive Edging device 300 may include a network interface 307 to facilitate communication via an electronic communications network 304. The network interface 307 may be configured to implement wired or wireless communication over local area networks and wide area networks such as the Internet. The device 300 may send and receive data and/or requests for files via one or more message packets over the network 304. Message packets sent over the network 304 may temporarily be stored in a cache 309 in memory 305. The client device 302 may connect through the network interface 307 to the electronic communications network 304. Alternatively, the client device 303 may be in communication with the standalone Reductive Edging device 300 over the electronic communication network 304.

Figure 4:
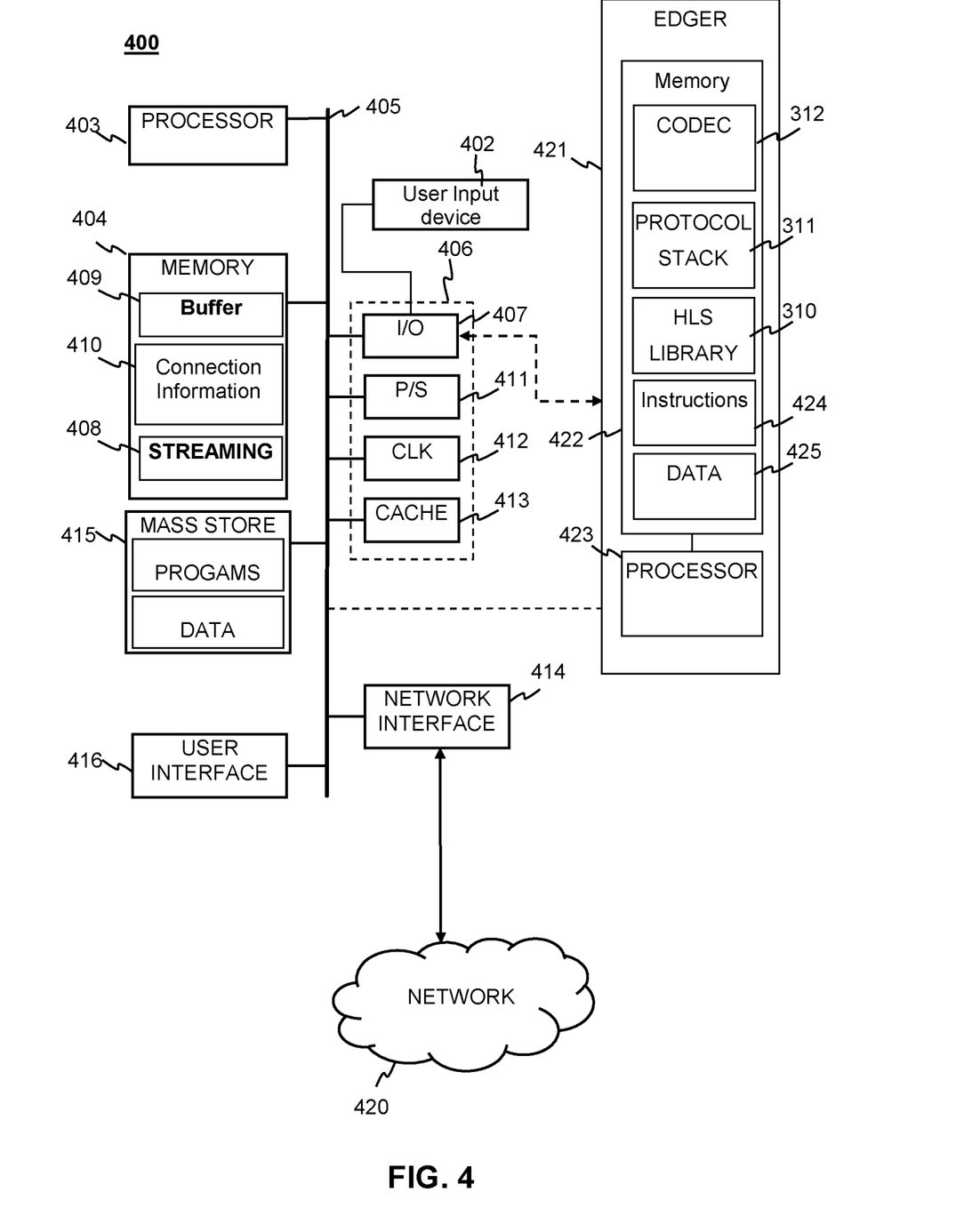
FIG. 4 is a block diagram of an embedded reductive edger implementing the method for improving latency in streaming applications according to aspects of the present disclosure.

FIG. 4 depicts an embedded Reductive Edging system according to aspects of the present disclosure. The embedded Reductive Edging system may include a CDN server or a studio computing device 400 coupled to an operator's input device 402. The operator's input device 402 may be a controller, touch screen, microphone, keyboard, mouse, joystick or other device that allows the user to input information including sound data in to the system.

The computing device of the embedded Reductive Edging system 400 may include one or more processor units 403, which may be configured according to well-known architectures, such as, e.g., single-core, dual-core, quad-core, multi-core, processor-coprocessor, cell processor, and the like. The computing device may also include one or more memory units 404 (e.g., random access memory (RAM), dynamic random access memory (DRAM), read-only memory (ROM), and the like).

The processor unit 403 may execute one or more programs, portions of which may be stored in the memory 404 and the processor 403 may be operatively coupled to the memory, e.g., by accessing the memory via a data bus 405. The programs may be configured to implement streaming media through HLS systems 408. Additionally the Memory 404 may contain information about connections between the system and one or more streaming servers 410. The Memory 404 may also contain a buffer of media segments 409. The Media segments and connection information may also be stored as data 418 in the Mass Store 418.

The computing device 400 may also include well-known support circuits, such as input/output (I/O) 407, circuits, power supplies (P/S) 411, a clock (CLK) 412, and cache 413, which may communicate with other components of the system, e.g., via the bus 405. The computing device may include a network interface 414. The processor unit 403 and network interface 414 may be configured to implement a local area network (LAN) or personal area network (PAN), via a suitable network protocol, e.g., Bluetooth, for a PAN. The computing device may optionally include a mass storage device 415 such as a disk drive, CD-ROM drive, tape drive, flash memory, or the like, and the mass storage device may store programs and/or data. The computing device may also include a user interface 416 to facilitate interaction between the system and a user. The user interface may include a monitor, Television screen, speakers, headphones or other devices that communicate information to the user.

The computing device 400 may include a network interface 414 to facilitate communication via an electronic communications network 420. The network interface 414 may be configured to implement wired or wireless communication over local area networks and wide area networks such as the Internet. The device 400 may send and receive data and/or requests for files via one or more message packets over the network 420. Message packets sent over the network 420 may temporarily be stored in a buffer 409 in memory 404.

In some implementations, the embedded Reductive Edging or embedded Edger 421 may be an embedded hardware component of a CDN or a studio server device 400, which may be coupled to the main processor via the bus and requests may be received from applications, e.g., streaming applications, running on the client device. In some implementations, the embedded Edger 421 may initiate and intercept network communications directed toward a CDN or other servers. In these implementations, the embedded Edger 421 may lack a network interface or the network interface may not be used. In other implementations, the embedded Edger, the functions of the edger may be implemented in streaming software 408 stored in the memory 404 or in programs 417 stored in the mass store 415 and executed on the processor 403.

In some alternative implementation the embedded Edger 421 may be an external device coupled to the client device 400, e.g., via a local non-network connection, such as the I/O functions 407.

The processor of the embedded Edger unit 421 may execute one or more instructions 424, portions of which may be stored in the edger memory 422 and the processor 423 may be operatively coupled to the memory 422 through a bus or bus type connection. The instructions 424 may be configured to implement the method for improving latency in HLS live streaming systems shown in FIG. 2. Additionally the Memory 422 may contain instructions for storing Playlists and modified playlists in a HLS Library and a Protocol Stack defining HLS server locations. The Memory 422 may also contain the HLS Library 310, the Protocol Stack 311 and a coder/decoder (codec) 312. The instructions 424 may further implement storage of media segments as data 425 during operation. Alternatively the HLS Library, Protocol stack and media segments may be stored on the client device 400 in the buffer 408 or as connection information 408 in memory 404 or as data 418 in the Mass Store 415.

Figure 5:
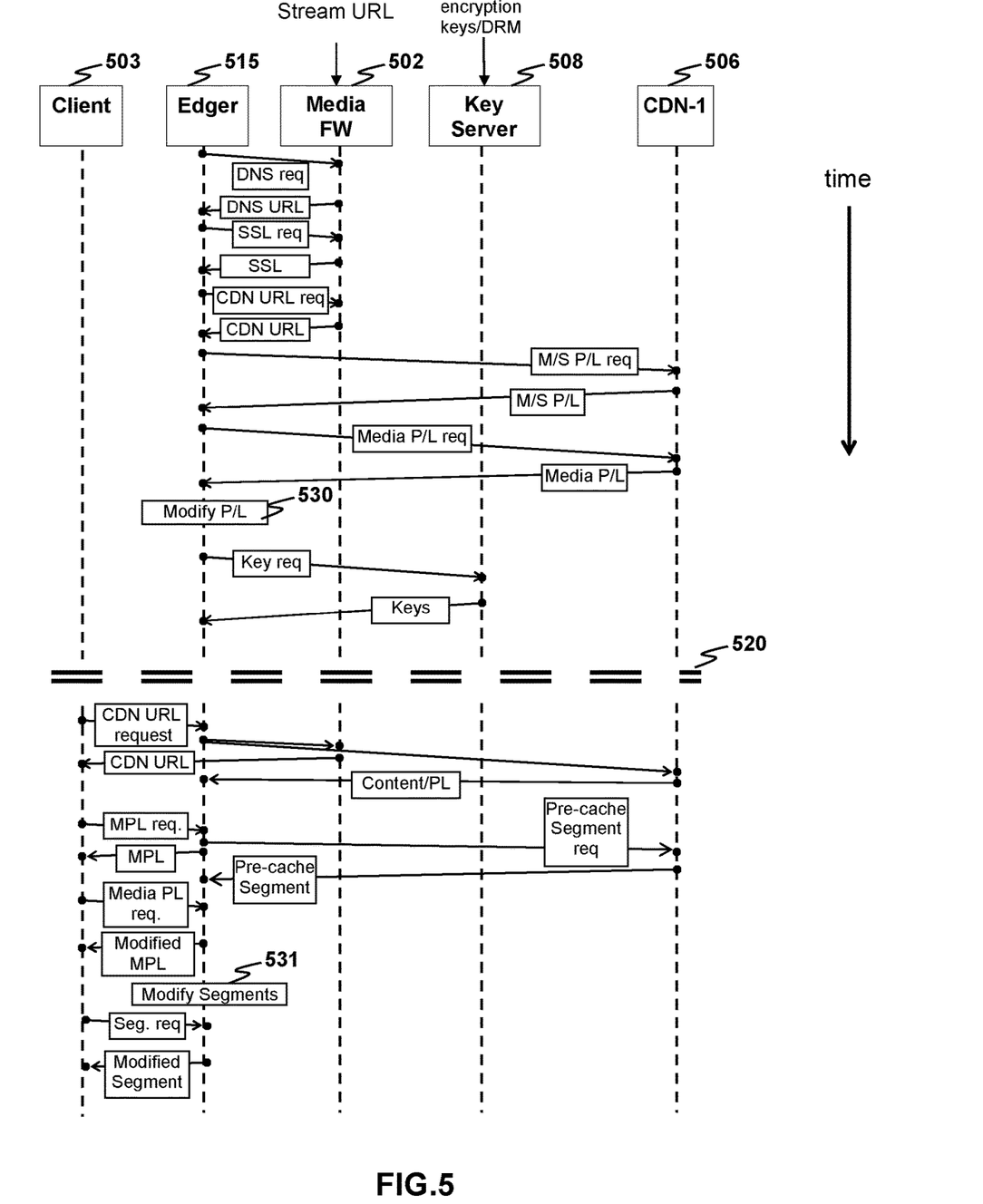
FIG. 5 is a timing diagram of the method for improving latency in streaming application according to aspects of the present disclosure.

FIG. 5 depicts a timing diagram of the method of operation of the Reductive Edging device in communication with a client device according to aspects of the present disclosure. The Reductive Edger begins operation before the client device begins communication with the servers hosting HLS data as indicated by the double line 520. In some implementations, the client device may not be powered while the Reductive Edging performs the operation above the double line 520.

The Reductive Edging device 515 may begin operation by sending a request to the domain name system (DNS) for the location of the Media Framework Server 502. The DNS sends the location, typically in the form of an IP address, of the Media Framework Server back the to the Reductive Edging device 515, where it is received. In some implementations the Reductive Edging device 515 may contact a trusted source and download a secure socket layer (SSL) certificate for encrypted communication. This trusted source may be part of the media framework 502. The SSL certificate is used during communication with SSL enabled servers to encrypt communication. This encryption ensures that communications made by the server to the client and vice versa, intercepted by third parties will be unintelligible.

The Reductive Edging device 515 may then send a request to the Media Framework 502 for the location of the CDN. The Media Framework 502 may return the location of the CDN to the Reductive Edging device 515. The CDN location is then stored and used for subsequent communications. The Reductive Edging device 515 sends a communication through the network to the CDN 506 requesting the Master Playlists. In response, the CDN 506 sends the Master Playlists through the network where it is received by the Reductive Edging device 515. The Reductive Edging device 515 then stores the Master Playlist.

As discussed above the Master Playlist contains a list of locations of a media presentation at different bitrates, in different formats or with alternate versions of the content. The number of different media presentations on the CDN 506 is finite. Therefore to accelerate the streaming process, in some implementations the Media Pre-fetcher may request a Master Playlist comprising every Media Presentation on the CDN 506. The Master playlists are then stored in memory or mass storage. In some implementations, the Reductive Edging device may predictively request Master Playlists to reduce download time and memory space required for the Master Playlists. For example and without limitation, the Reductive Edging device may track the user's viewing habits in a table so that the device has a record of what piece of content the user last viewed. The device may download the Master list for that content before the user request to view the content or even starts the client device. Similarly, for games the system may track games the user frequently plays and download a master list for if playtime or number of sessions for the game is above a certain threshold. Note that while this implementation is described in the context of games it may also be applied to other media types such as video or music.

Once the Master Playlist is received at the Reductive Edging Device, a request may be sent to the CDN 506 for Media Playlists by the Reductive Edging device 515. Similar to the Master Playlist, there are a finite number of Media presentations on the CDN 506. Therefore, the Reductive Edging device may request a media playlist for every media presentation on the CDN 506. Predictive methods may also be used to reduce the number of content playlists downloaded. The Predictions methods for prospective fetching of media playlists are substantially similar to those described above with respect to the master playlist.

After the CDN 506 receives the request for Media Playlists, it sends the Media Playlists through the network to the Reductive Edging device 515. The Media Playlists are received by the Reductive Edging device 515 and stored either in memory or in mass storage.

According to aspects of the present disclosure the Reductive Edging device 515 decrypts the media playlist determines the byte range for IDR-Frames within each segment of the Media playlist. In some embodiments the media playlist is de-multiplexed before determine the byte range for the IDR-Frames within each segment of the media playlist. In most implementations, no decryption is necessary. The I-frame-only playlist provides the starting location of each IDR frame and the Reductive Edger determines the complete byte range of each IDR frame. When a client requests this segment, the encrypted byte range is returned and the client can decrypt in the usual way—by acquiring the decryption key and applying it to the encrypted segment, The Reductive Edging device 515 then splits the each segment listed in the media playlist at each IDR-Frame generating a Modified media playlist 530. In some embodiments, the Reductive edging device splits each segment in the media playlist every other IDR-frame or every N IDR-Frame where N is determined by the network latency. The modified media playlist is then re-encrypted.

The Reductive Edging device 515 may then request keys from the Key Server 508 for each media playlist received from the CDN 506. These keys are stored in memory or in mass storage after they are received by the Reductive Edging device 515 from the Key server 508.

Once the user initiates the streaming system on the client device 503 communication between the client device 503 and the Reductive Edging device 515 may begin. The client device may be configured to communicate with the Reductive Edging device as though it were part of the media framework and in the content delivery network. Thus, the Reductive Edging device 515 may receive a request for the CDN location from the client device 503. The Reductive Edging device 515 forwards the request to the Media Framework 502. The Media framework 502 replies with the CDN location, which is received by the client device 503.

After receipt of the CDN location, the client device 503 sends a request for a master playlist from the Reductive Edging device 515. The client device 503 may be configured to request Playlists from the Reductive Edging device 515 before contacting the CDN 506 or instead of the CDN 506. After receiving the request for a master playlist the Reductive Edging device 515 may send the requested master playlist to the client device 503. The Reductive Edging device already has every master playlist in memory as the device has received all of the master playlists from the CDN earlier. In implementations, that predictively request master playlists the memory contains master playlists likely to be requested as such there is the possibility that the prediction was incorrect and in such a case the request will be forwarded to the CDN 506.

After receiving the master playlist request, the Reductive Edging device 515 may also send a request to the CDN 506 for media segments for prospective caching. In some implementations the Reductive Edging device 515 may request media segments for every media playlist in the master playlist that was request by the client device 503. In other implementations, the Reductive Edging device 515 may track the most recently requested media playlist and may request media segments from the same media playlist or a congruent media playlist. By way of example and not by way of limitation the Reductive Edging device may keep a table of the five most recently requested media playlists, media segments downloaded etc. There may be some meta-information about each media playlist for example, the table entry may have information about the order in which media playlists are typically requested and information about the location next media playlist likely to be requested i.e. "Previous Watched: TV Show Episode 1—Next episode: TV Show Episode 2—Location of Next Episode: Location.Location." The Reductive Edging device may request media segments from media congruent with the meta-information, for example and without limitation the next episode in the series. In other implementations, the table may track user preferences such as Language, and connection speed and request media segments from the Master List that match those preferences.

The CDN 506 begins sending media segments to the Reductive Edging device 515 after the request for media segments is received. The Reductive Edging device 515 receives and stores the media segments from the CDN 206. The media segments may be stored in memory, for example in a buffer or in Mass Storage.

The Client device 203 may request a media playlist from the Reductive Edging device 210. In response the Reductive Edging device 210 may send the media playlist to the Client device 203. The Reductive Edging device 210 already has all of the media playlists for the requested master playlist in memory and therefore only needs to retrieve the requested media playlist from memory.

The Reductive Edging device 515 decode each store media segment and splits each media segment according to the segmentation of the modified media playlist 531 to generate modified media segments. The modified media segments are then encoded.

Next, the client device 503 may request a modified media segment from the Reductive Edging device 515. When the request for the modified media segment is received at the Reductive Edging device 515, it may query its memory or mass storage for the modified media segment. If a modified media segment is found, the Reductive Edging device sends the segment to the client device 503. If the media segment is not found a request for the media segment corresponding to the modified media segment is sent to the CDN 506. Upon receiving the request for a media segment, the CDN sends the requested media segment to the Reductive Edging device 515. The Reductive Edging device 515 stores the media segment in memory or mass storage after receiving the media segment. The Reductive Edging device 515 then decodes the received media segment, splits the media segment according to the segmentation of the modified media playlist to generate modified media segment, and encodes the modified media segment. The new generated modified media segment may then be sent to the client device 503. Once media segments are being sent from the CDN 506 and received at the Reductive Edging device 515 the Reductive Edging device 506, may store media segments ahead of the client device 503, generate modified media segments and send them to the client 503 device as necessary.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:
1. A method for latency reduction in streaming media comprising;
 a) requesting an IDR-frame only playlist from a content delivery network;

b) receiving the IDR-frame only playlist from the content delivery network;
c) determining the location of one or more IDR frames in each segment in the IDR-frame only playlist received from the content delivery network;
d) generating a modified playlist having modified segmentation using the location of the one or more I-frames in each segment in the IDR-frame only playlist, wherein the modified segmentation is based on a smallest segment size that a client device can handle;
e) sending the modified playlist to the client device;
f) requesting all media segments from the modified playlist prior to receiving a request for a modified media segment from the client device;
g) receiving the requested media segments;
h) modifying a media segment of the received media segments in accordance with the modified segmentation of the modified playlist to generate the modified media segment;
i) sending the modified media segment to the client device.

2. The method of claim 1 wherein the generating the modified playlist includes splitting a segment in the playlist at one or more DR frames.

3. The method of claim 2, wherein the modifying the media segment includes splitting the media segment at one or more IDR frames.

4. The method of claim 1 wherein determining the location of one or more I-frames in each segment in the playlist includes determining the byte range between a first I-frame and a second I-frame.

5. The method of claim 1 wherein the playlist is a media playlist and wherein determining the location one or more I-frames includes de-multiplexing the playlist.

6. The method of claim 1 further comprising generating media sequence numbers for the modified playlist.

7. The method of claim 1 wherein sending the modified playlist to a client device comprises sending a playlist with no segment size information.

8. The method of claim 1 wherein a size of the modified segments in the modified playlist is chosen to optimize playback for a specific client device.

9. A system for latency reduction in streaming media comprising:
a processor;
memory coupled to the processor;
non-transitory instructions embedded in the memory that when executed cause the processor to enact the method comprising:
a) requesting an IDR-frame only playlist from a content delivery network;
b) receiving the IDR-frame only playlist from the content delivery network;
c) determining the location of one or more DR frames in each segment in the IDR-frame only playlist received from the content delivery network;
d) generating a modified playlist having modified segmentation using the location of the one or more I-frames in each segment in the IDR-frame only playlist, wherein the modified segmentation is based on a smallest segment size that a client device can handle;
e) sending the modified playlist to the client device;
f) requesting all media segments from the modified playlist prior to receiving a request for a modified media segment from the client device;
g) receiving the requested media segments;
h) modifying a media segment of the received media segments in accordance with the modified segmentation of the modified playlist to generate the modified media segment;
i) sending the modified media segment to the client device.

10. The system of claim 9 wherein the generating the modified playlist includes splitting a segment in the playlist at one or more IDR frames.

11. The system of claim 10, wherein the modifying the media segment includes splitting the media segment at one or more IDR frames.

12. The system of claim 9 wherein determining the location of one or more I-frames in each segment in the playlist includes determining the byte range between a first I-frame and a second I-frame.

13. The system of claim 9 wherein the playlist is a media playlist and wherein determining the location one or more I-frames includes de-multiplexing the playlist.

14. The system of claim 9 further comprising generating media sequence numbers for the modified playlist.

15. The system of claim 9 wherein sending the modified playlist to a client device comprises sending a playlist with no segment size information.

16. The system of claim 9 wherein a size of the modified segments in the modified playlist is chosen to optimize playback for a specific client device.

17. Non-transitory instructions embedded in a computer readable medium that when executed cause a computer to perform the method comprising:
a) requesting an IDR-frame only playlist from a content delivery network;
b) receiving the IDR-frame only playlist from the content delivery network;
c) determining the location of one or more I-frames in each segment in the IDR-frame only playlist received from the content delivery network;
d) generating a modified playlist having modified segmentation using the location of the one or more I-frames in each segment in the playlist, wherein the modified segmentation is based on a smallest segment size that a client device can handle;
e) sending the modified playlist to the client device;
f) requesting all media segments from the modified playlist prior to receiving a request for a modified media segment from the client device;
g) receiving the requested media segments;
h) modifying a media segment of the received media segments in accordance with the modified segmentation of the modified playlist to generate the modified media segment;
i) sending the modified media segment to the client device.

18. The non-transitory instructions of claim 17, wherein the modifying the media segment includes splitting the media segment at one or more IDR frames.

* * * * *